Figure 1:
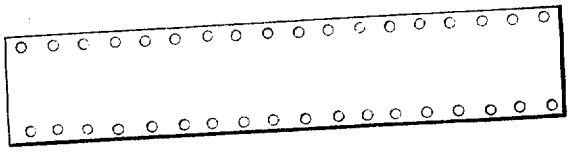
Figure 4:
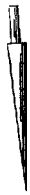
Figure 2:
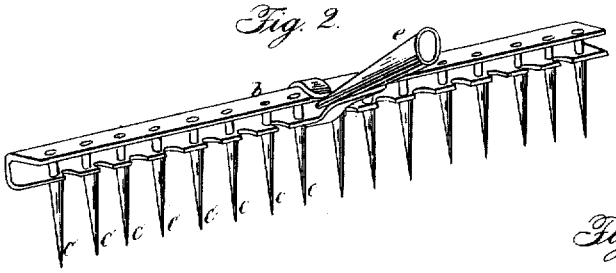
Figure 7:
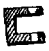
Figure 5:
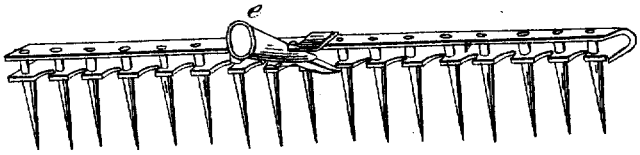
Figure 6:
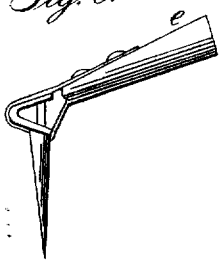

SANFORD & PARMELEE.

Rake.

Patented June 8, 1830.

X6022

H. L. Ellsworth

AM. PHOTO-LITHO. CO. N. Y. (OSBORNE'S PI

Nathaniel C. Sanford, & Erastus P. Parmelee of Meriden, Conn<sup></sup>t.

Letters Patent 6022X

The schedule referred to in these Letters Patent, and making part of the same, containing a description in the words of the said Nathaniel C. Sanford, and Erastus P. Parmelee themselves, of their improvement in the Iron tooth Rake.

---

To all to whom these presents shall come: Be it known that we, Nathaniel C. Sanford and Erastus P. Parmelee of Meriden, in the County of New Haven, in the State of Connecticut, citizens of the United States, have invented a new & useful improvement in the iron tooth rake, & that the following is a full & exact description of the construction & operation of the said machine, as invented or improved by us. The head of the rake is made of sheet or hoop iron, about two inches in width, & of sufficient length for the rake intended, & of about one sixteenth of an inch thick. Holes are punched or drilled through this plate of iron, near the edges, about one eighth of an inch from the outer edges & at sufficient distance apart for the space designed between the teeth. The holes through the part intended for the bottom or underside of the head may be round or an oblong square, having the longest diameter, at right angles with the edge of the plate. The holes in the edge designed for the top of the head, should be fitted on the upper side with a countersink, for the purpose of rivetting the teeth. About half an inch in width of each edge of the plate is then turned off at right angles with the back part of the head, so that the holes in the upper & lower edges may be exactly opposite to each other: or when preferred, the top part may be so turned as to form an acute & the bottom an obtuse angle with the back. — —
The teeth which are also made of iron or steel and of any desired shape, are made with a shoulder, about one inch from the upper end above the shoulder, of a size & shape to fit the holes in the head. The lower end of the teeth to be tapered nearly to a point. The teeth are then inserted through the holes in the head & rivetted on the upper side, so as to bring the shoulders of the teeth firmly against the under side of the head. The space between the teeth may be scolloped out. A pipe or socket to receive the

[illegible]

handle is then attached to the centre of the head, standing nearly at right angles with the teeth. Bows or braces may be attached to support & strengthen the head & handle. Or instead of making the head in the manner stated above, the angle or lip of the lower side may be omitted, & the teeth secured into or on the lower edge of the back of the head, either by rivetting, welding, brazing, or by a notch & lip made in the shoulder of the teeth, to receive the lower edge of the back, and a corresponding notch in the lower edge of the back, to prevent a side motion of the teeth, so that when the teeth are rivetted, on the top, these will lock together, & make the teeth very firm & strong. Of these modes of securing the teeth & making the head, we prefer the last. Instead of making the head in either of the modes above described, it may be formed of the same kind of plated iron, & turned round like the small part of a gun barrel & the teeth put through & rivetted on the top as before described: & in this way if preferred the shape of the head may be varied so as to form an ellipsis, a semicircle, or a triangle. In either of these modes the socket to which the handle is to be attached, may be secured to the head by a clasp, passing round it & rivetted to the socket. When the head is made in either shape or form last named, or any other convenient shape, the teeth may be made with a hole or ring at the upper end of them, of a shape and size to fit the head, and the head passing through the upper ends of the teeth so made they may be secured to the head either by welding, brazing, or rivetting. When the teeth are made in this latter mode, a head of wood may be used. The advantages of a rake made in the manner herein above specified, over the ordinary rakes now in use, are, that it combines strength with cheapness. The rake is rendered very light, from the peculiar manner of forming the head. The teeth also being set in this manner are very firm, & less liable to become loose by using than in any of the ordinary ways of attaching teeth to the head of a rake. We do not claim as our invention, a rake with an iron head merely, nor the particular manner herein described of attaching the handle to the head, neither do we claim the form or shape of the teeth. But we do claim as our invention & improvement, the application to the construction of [illegible] the art or invention or method of so shaping a thin piece or plate of iron, to make the head in the manner above described, as to secure a great degree of strength & still have it sufficiently light to answer for all the ordinary uses, to which an iron tooth rake is or may be applied –

We also claim, as our invention, the peculiar manner in which the teeth are connected with or attached to the head – which by having two bearings or resting places at the top & bottom of the head, secures them permanently in their places – In testimony that the above is a true specification of our improvement as above described, we have hereunto set our hands & seals, this 6th day of May, A.D. 1830 –

Witnesses

Elizabeth Andrews
Benajah Andrews

Nathaniel C. Sanford
Erastus P. Parmelee

[illegible]

[illegible]